United States Patent
Kimura et al.

(10) Patent No.: US 12,382,215 B2
(45) Date of Patent: Aug. 5, 2025

(54) VIBRATION ISOLATOR AND ELECTRONIC APPARATUS

(71) Applicant: LENOVO (SINGAPORE) PTE. LTD., Singapore (SG)

(72) Inventors: Kosei Kimura, Yokohama (JP); Takumi Imai, Yokohama (JP); Hironari Nishino, Yokohama (JP); Yoshiyuki Shibayama, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 293 days.

(21) Appl. No.: 18/174,078

(22) Filed: Feb. 24, 2023

(65) Prior Publication Data
US 2023/0370768 A1 Nov. 16, 2023

(30) Foreign Application Priority Data
May 11, 2022 (JP) .................. 2022-078351

(51) Int. Cl.
*H04R 1/28* (2006.01)
*G06F 1/16* (2006.01)
*H04R 1/02* (2006.01)

(52) U.S. Cl.
CPC ............ *H04R 1/288* (2013.01); *H04R 1/026* (2013.01); *G06F 1/1688* (2013.01)

(58) Field of Classification Search
CPC ........ H04R 1/288; H04R 1/026; G06F 1/1688
USPC ....................................................... 181/151
See application file for complete search history.

(56) References Cited

U.S. PATENT DOCUMENTS

| | | | | |
|---|---|---|---|---|
| 7,035,419 B2 * | 4/2006 | Yu | .............. | H04R 1/2896 381/353 |
| 7,478,703 B2 * | 1/2009 | Nakamura | .............. | H04R 1/02 181/148 |
| 7,610,991 B2 * | 11/2009 | Suzuki | .............. | H04R 1/323 381/349 |
| 8,660,291 B2 * | 2/2014 | Wang | .............. | H04R 1/025 381/386 |
| 8,807,271 B2 * | 8/2014 | Chen | .............. | H04R 1/2896 381/388 |
| 10,843,714 B2 * | 11/2020 | Akiyama | .............. | B61F 1/00 |
| 2009/0021898 A1 * | 1/2009 | Konno | .............. | G06F 1/1688 361/679.55 |
| 2009/0178878 A1 * | 7/2009 | Winker | .............. | H04R 1/345 181/151 |

(Continued)

FOREIGN PATENT DOCUMENTS

| | | |
|---|---|---|
| CN | 213152298 U | 5/2021 |
| JP | 2000224681 A | 8/2000 |
| JP | 2012182322 A | 9/2012 |

(Continued)

*Primary Examiner* — Forrest M Phillips
(74) *Attorney, Agent, or Firm* — SHIMOKAJI IP

(57) ABSTRACT

A vibration isolator is a vibration isolator for supporting a speaker box to a chassis of an electronic apparatus and includes a main body having a bar shape, and an attachment piece having a plate shape, the attachment piece including a hole portion through which a screw thread to fix the vibration isolator to the speaker box is passed through, the attachment piece being provided to protrude from the main body. The main body includes a core and a rubber material covering a surface of the core, and the attachment piece is made of the rubber material.

10 Claims, 11 Drawing Sheets

(56) References Cited

U.S. PATENT DOCUMENTS

2011/0253473 A1* 10/2011 Chan .................... H04R 1/2857
181/151

FOREIGN PATENT DOCUMENTS

| JP | 2020178244 A | 10/2020 |
|----|--------------|---------|
| WO | 2020250806 A1 | 12/2020 |

* cited by examiner

VIBRATION ISOLATOR AND ELECTRONIC APPARATUS

BACKGROUND OF THE INVENTION

Field of the Invention

The present invention relates to a vibration isolator configured to support a speaker box and an electronic apparatus including the vibration isolator.

Description of the Related Art

For example, there is an electronic apparatus configured to carry out a meeting or make a telephone conversation between distant places via voice or video images by use of the Internet, a phone line, or the like. The electronic apparatus of this type is equipped with a speaker device configured to output a voice or the like emitted from a meeting partner (for example, see Japanese Unexamined Patent Application Publication No. 2020-178244).

SUMMARY OF THE INVENTION

Since it is necessary for the speaker device of the electronic apparatus as described above to send sound to a relatively wide space such as a meeting room, the speaker device should include a speaker box with a sufficient volume. On this account, it is necessary for a vibration isolator configured to support the speaker box to restrain an influence on the volume of the speaker box. Further, it is necessary for the vibration isolator to be able to stably support the speaker box inside a chassis in which a space is hard to be secured. On this account, such a configuration that rubber molded in a dome shape is just attached to the speaker box, for example, is hard to stably support the speaker box, and the configuration largely affects the volume of the speaker box.

The present invention is accomplished in consideration of the above problem in the related art, and an object of the present invention is to provide a vibration isolator that can stably support a speaker box and restrain an influence on the volume of the speaker box, and an electronic apparatus including the vibration isolator.

A vibration isolator according to a first aspect of the present invention is a vibration isolator for supporting a speaker box in a chassis of an electronic apparatus. The vibration isolator includes: a main body having a bar shape; and an attachment piece having a plate shape, the attachment piece including a hole portion through which a screw thread to fix the vibration isolator to the speaker box is passed through, the attachment piece being provided to protrude from the main body. The main body includes a core and a rubber material covering a surface of the core, and the attachment piece is made of the rubber material.

An electronic apparatus according to a second aspect of the present invention includes: a chassis; a speaker box stored in the chassis; and a vibration isolator attached to the speaker box and configured to support the speaker box to the chassis. The vibration isolator includes: a main body having a bar shape; and an attachment piece having a plate shape, the attachment piece including a hole portion through which a screw thread to fix the vibration isolator to the speaker box is passed through, the attachment piece being provided to protrude from the main body. The main body includes a core and a rubber material covering a surface of the core, and the attachment piece is made of the rubber material.

With the aspects of the present invention, it is possible to stably support the speaker box and to restrain an influence on the volume of the speaker box.

DETAILED DESCRIPTION OF THE INVENTION

The following will describe details of a preferred embodiment of a vibration isolator and an electronic apparatus according to the present invention with reference to the attached drawings.

Figure 1:
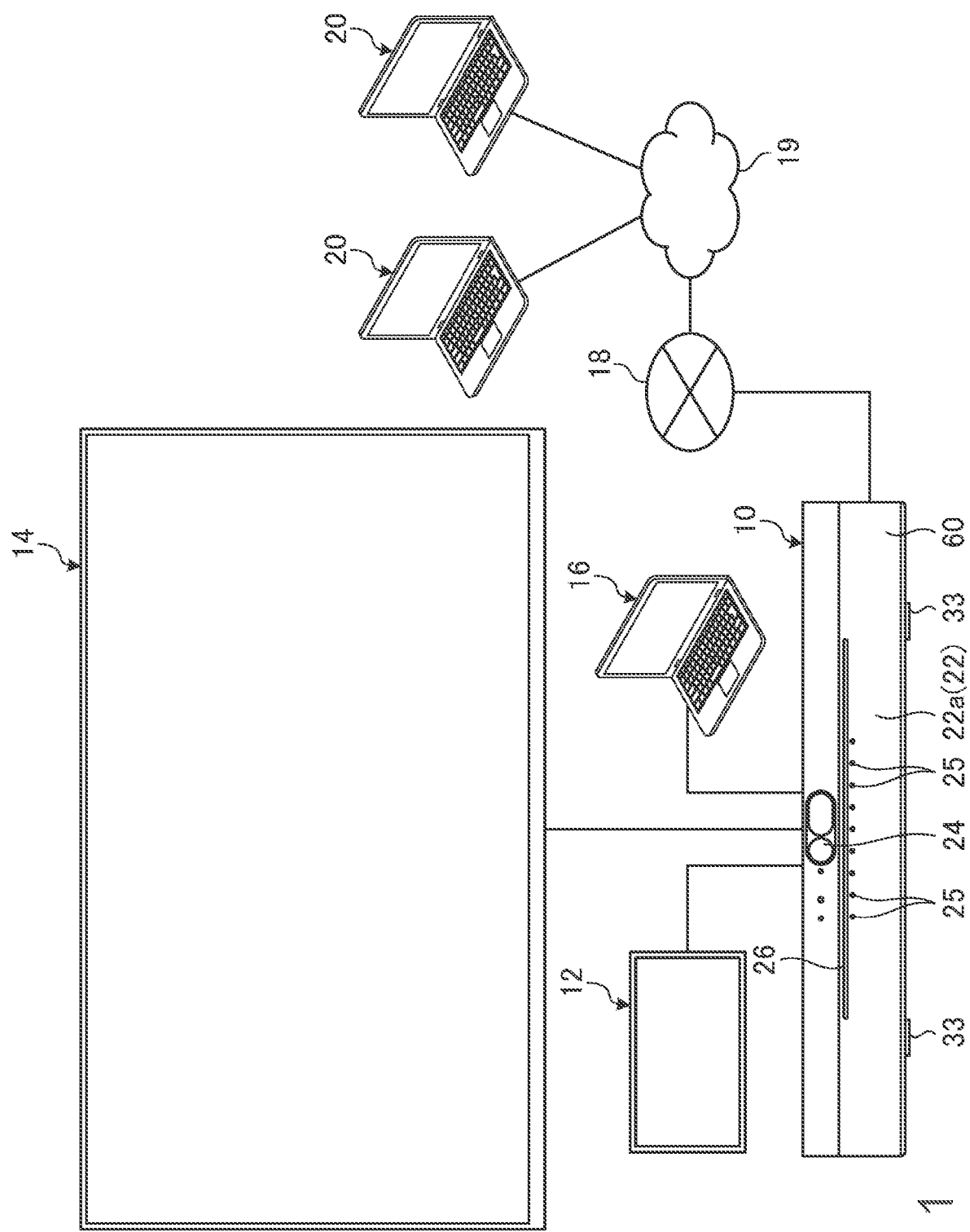
FIG. 1 is a system chart illustrating one use form of an electronic apparatus according to one embodiment.

FIG. 1 is a system chart illustrating one use form of an electronic apparatus 10 according to one embodiment. The electronic apparatus 10 of the present embodiment is a terminal apparatus usable in an on-line meeting system in which a meeting is carried out or a telephone conversation is made by use of voice or video images between distant places connected via the Internet, for example.

The on-line meeting system illustrated in FIG. 1 includes the electronic apparatus 10 according to the present embodiment, a touch panel operating portion 12, an external display 14, and personal computers 16. As illustrated in FIG. 1, the electronic apparatus 10 is hung on a wall of a meeting room and fixed above or below the external display 14 hung and fixed on the wall, for example. The electronic apparatus 10 can be used such that the electronic apparatus 10 is placed on a table or the like.

The touch panel operating portion 12 is a touch-panel terminal for an input operation to the electronic apparatus 10. The external display 14 can display information from a personal computer 20 of a meeting partner, connected to the electronic apparatus 10 via an internet 18 and a cloud server 19, for example. More specifically, the external display 14 displays a video image of the face of the meeting partner, data, and so on under control of the electronic apparatus 10. The personal computer 16 can transmit data or the like from a user of the electronic apparatus 10 to the external display 14 and the personal computer 20 of the meeting partner, for example. The personal computer 16 may be used for an input operation to the electronic apparatus 10 instead of the touch panel operating portion 12.

The electronic apparatus 10, the touch panel operating portion 12, the external display 14, and the personal computers 16 are connected to each other by use of connectors and cables in conformity with a predetermined connection standard such as a USB standard and an HDMI (registered trademark) standard, for example.

First described is an appearance structure of the electronic apparatus 10.

Figure 2A:
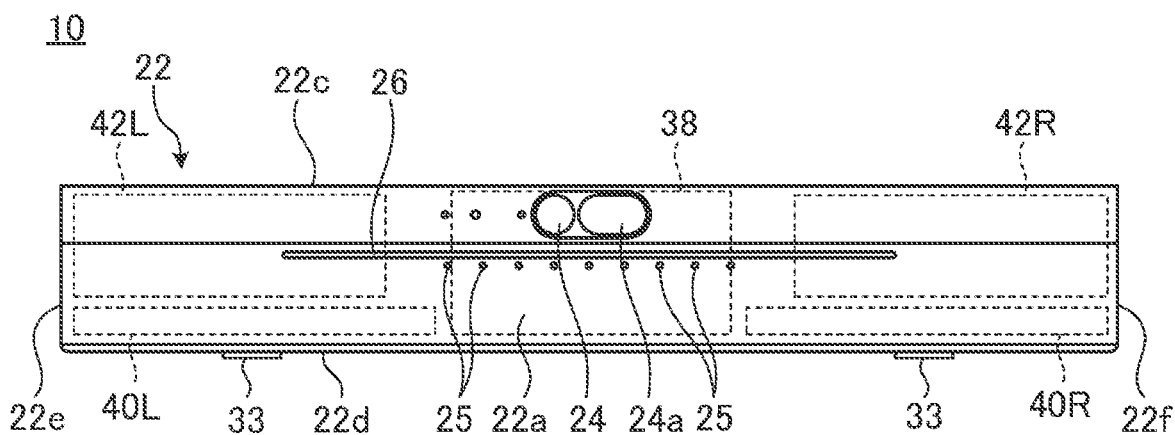
FIG. 2A is a front view of the electronic apparatus.
Figure 2B:
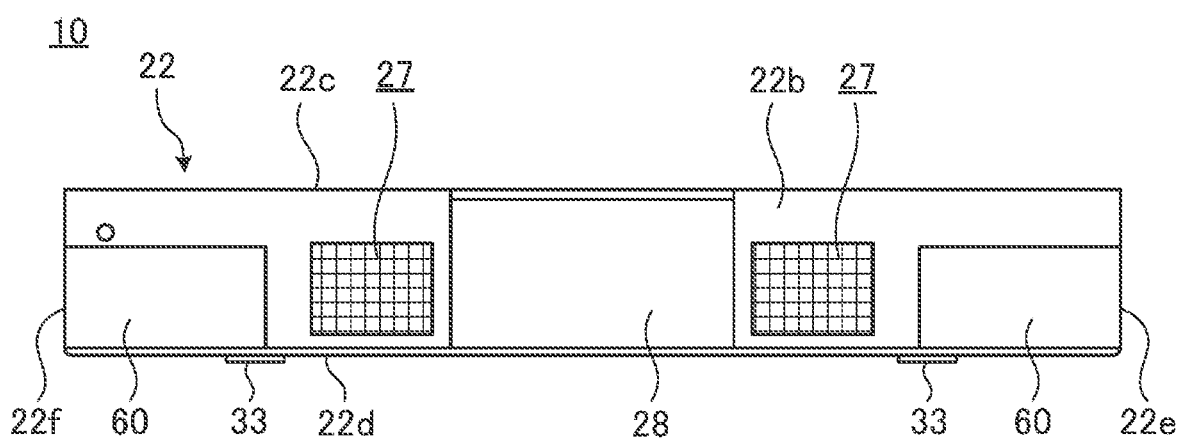
FIG. 2B is a rear view of the electronic apparatus.

FIG. 2A is a front view of the electronic apparatus 10. FIG. 2B is a rear view of the electronic apparatus 10.

As illustrated in FIGS. 2A, 2B, the electronic apparatus 10 includes a chassis 22. Hereinafter, the electronic apparatus 10 and its elements will be described with the height direction of the chassis 22 being referred to as a top-bottom direction, the width direction of the chassis 22 being referred to as a right-left direction, and the depth direction of the chassis 22 being referred to as a front-rear direction based on directions when the electronic apparatus 10 and the elements are viewed from their front side as illustrated FIG. 2A.

The chassis 22 has an oblong bar shape and is a box-shaped member having a generally rectangular solid shape. Because of this, a front surface 22a and a back surface 22b of the chassis 22 each have a width dimension oblong in the right-left direction and a height dimension smaller than the width dimension. A top surface 22c and a bottom surface 22d of the chassis 22 each have a width dimension oblong in the right-left direction and a depth dimension smaller than the width dimension (see FIG. 3). A left surface 22e and a right surface 22f of the chassis 22 each have a depth dimension narrow in the front-rear direction and a height dimension in the top-bottom direction, the height dimension being slightly larger than the depth dimension.

As illustrated in FIG. 2A, a camera 24, a microphone 25, and a light 26 are provided on the front surface 22a.

The camera 24 is a camera device configured to capture an image of the user positioned on the front side of the electronic apparatus 10. The camera 24 is placed in an upper part of generally the center of the front surface 22a in the right-left direction. A reference number 24a in FIG. 2A indicates a sliding shutter that can physically cover the camera 24. The microphone 25 is a microphone device configured to collect the voice of the user of the electronic apparatus 10, and so on. The microphone 25 faces the front surface 22a through a plurality of microphone holes arranged in the right-left direction below the camera 24. The light 26 is a light notification portion to notify the user of an operation state of the electronic apparatus 10, a sound collecting state of the microphone 25, and so on and serves as a display portion called a smart light. The light 26 faces the front surface 22a through an oblong and thin light transmission window provided between the camera 24 and the microphone 25. Furthermore, a power indication light of the electronic apparatus 10, a display to display a clock and the operation state, and so on are also provided on the front surface 22a.

As illustrated in FIG. 2B, a pair of right and left back-surface intake ports 27, 27 and a connection terminal portion 28 are provided on the back surface 22b. The back-surface intake port 27 is an opening via which the inside and the outside of the chassis 22 communicate with each other. The back-surface intake port 27 has a mesh structure in which many hole portions are provided collectively or a structure in which a plurality of slits is arranged, for example. The connection terminal portion 28 is an external terminal block to which connectors for the electronic apparatus 10 to be connected to the touch panel operating portion 12, the external display 14, the personal computer 16, the internet 18, and so on are connected. A power cable for the electronic apparatus 10 to be connected to an external power supply is also connected to the connection terminal portion 28.

A pair of right and left rubber legs 33, 33 and a bottom-surface intake port are provided on the bottom surface 22d. The rubber leg 33 is a leg portion used when the electronic apparatus 10 is used in a state where the electronic apparatus 10 is put on the table or the like. As described above, the electronic apparatus 10 can be hung on the wall or the like of the meeting room without using the rubber legs 33. When the electronic apparatus 10 is used in a state where the electronic apparatus 10 is hung on the wall, the electronic apparatus 10 may be used such that a predetermined bracket is attached to the back surface 22b. The bottom-surface intake port is an opening via which the inside and the outside of the chassis 22 communicate with each other. The bottom-surface intake port may have a mesh structure or a slit structure similar to that of the back-surface intake port 27, and a pair of right and left bottom-surface intake ports may be provided. The top surface 22c has generally the same outer shape as the bottom surface 22d, but the top surface 22c is formed of a flat plate.

Figure 3:
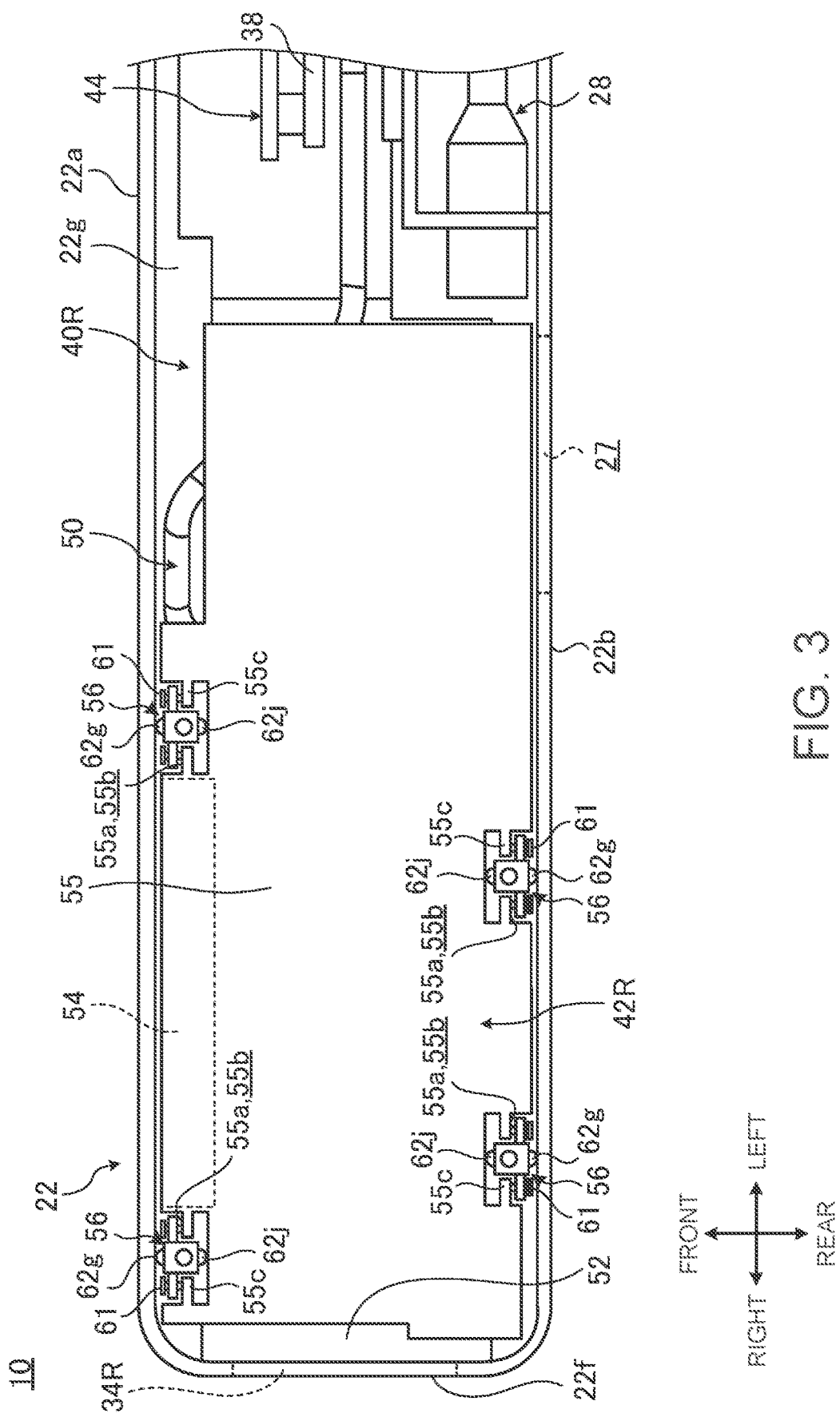
FIG. 3 is a plan view schematically illustrating an internal structure of the electronic apparatus.

A side-surface gas discharge port 34 is provided on the right surface 22f (see FIG. 3). The side-surface gas discharge port 34 is also provided on the left surface 22e. The side-surface gas discharge port 34 may also have a mesh structure or slit structure similar to that of the back-surface intake port 27.

Next will be described the internal structure of the electronic apparatus 10.

Figure 4:
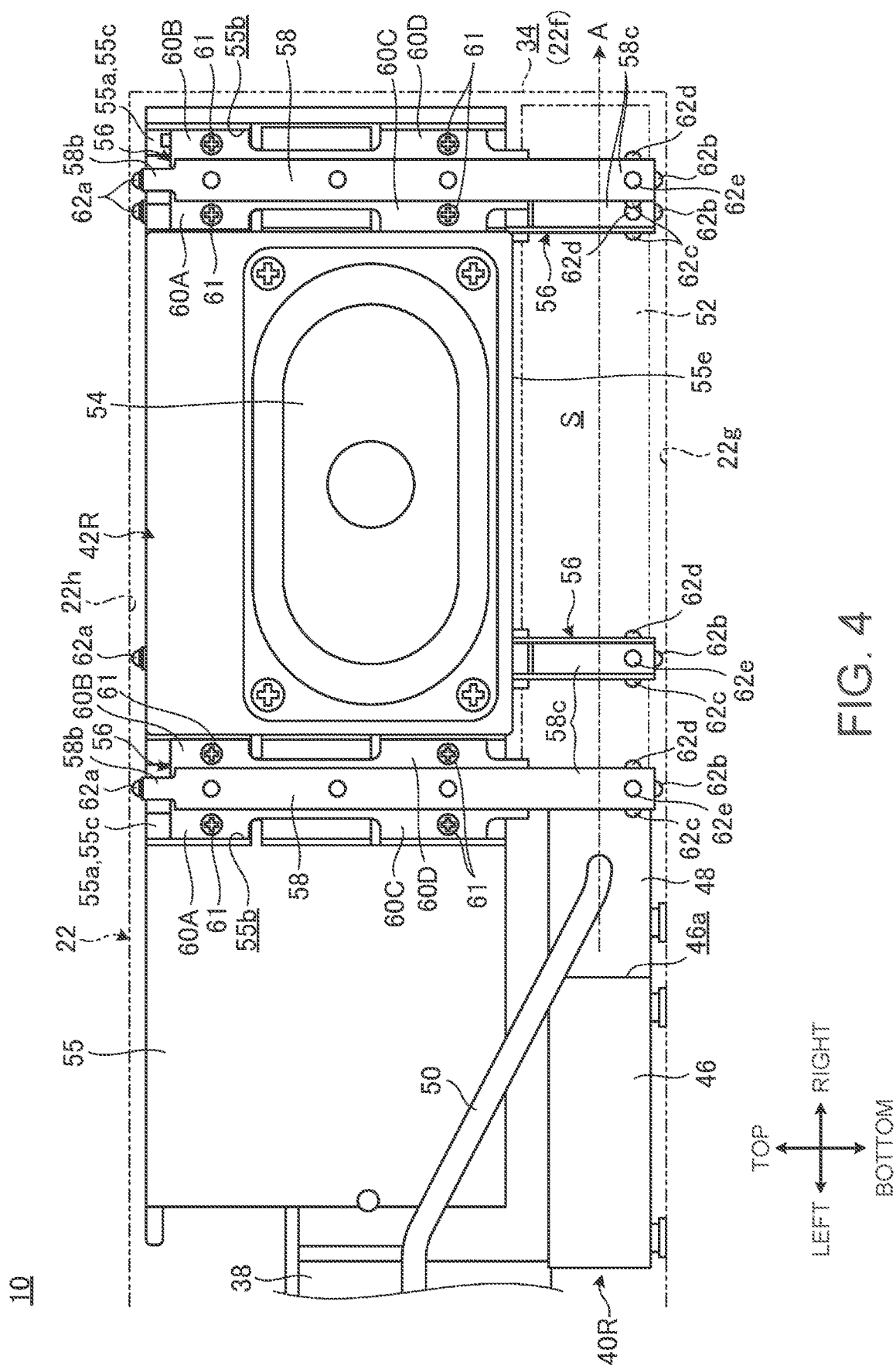
FIG. 4 is a schematic front view of a speaker device 4 illustrated in FIG. 3 and its peripheral part.
Figure 5:
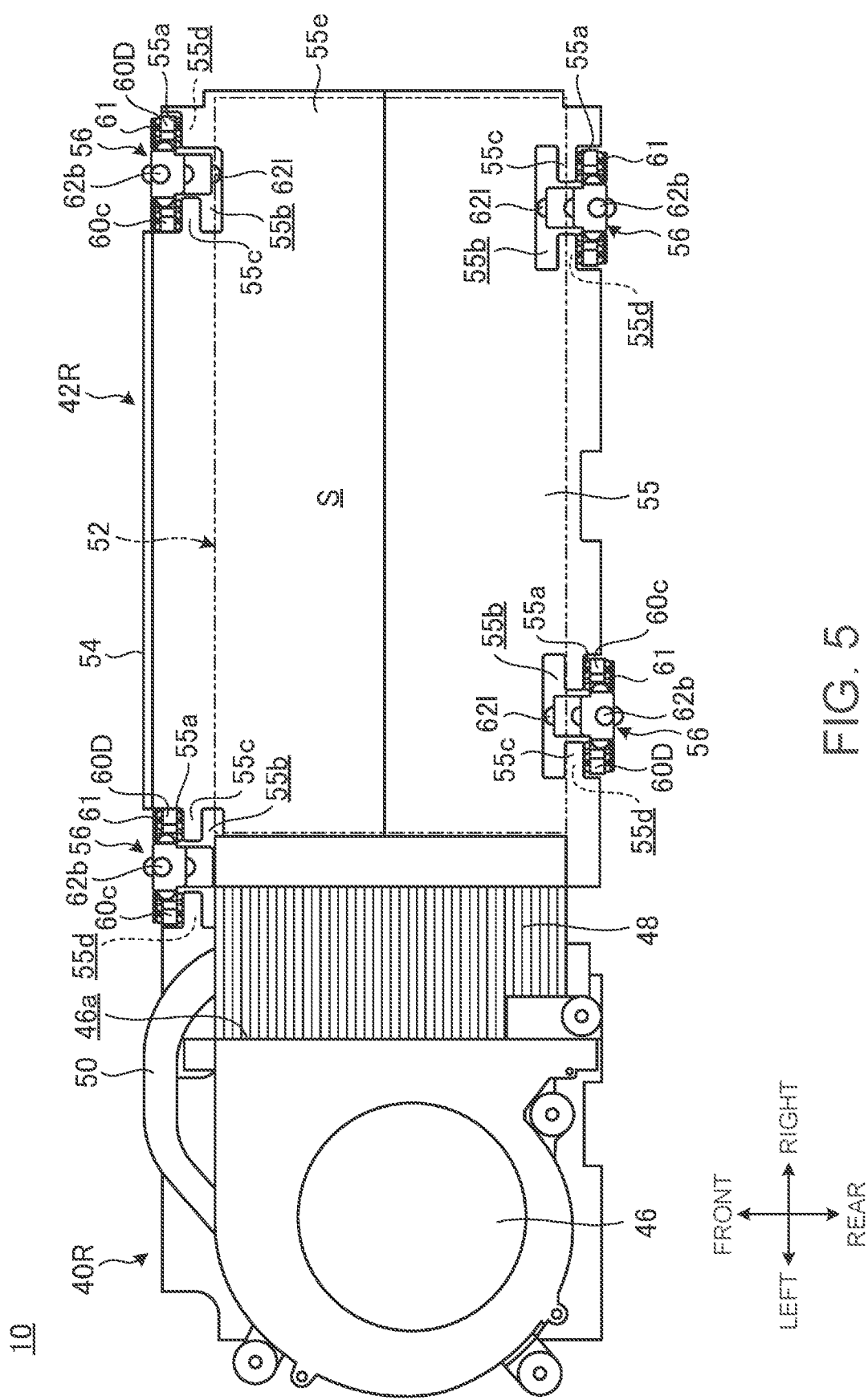
FIG. 5 is a schematic bottom view of the speaker device illustrated in FIG. 4 and its peripheral part.

FIG. 3 is a plan view schematically illustrating the internal structure of the electronic apparatus 10. FIG. 3 illustrates a generally right half part of the electronic apparatus 10, but a left half part of the electronic apparatus 10 may have a structure generally symmetric to the right half part. FIG. 4 is a front view of a speaker device 42R illustrated in FIG. 3 and its peripheral part. FIG. 5 is a bottom view of the speaker device 42R illustrated in FIG. 4 and its peripheral part.

As illustrated in FIGS. 2A, 3, a substrate 38 equipped with a CPU, a pair of right and left cooling devices 40R, 40L, and a pair of right and left speaker devices 42R, 42L are stored in the chassis 22.

The substrate 38 is a motherboard of the electronic apparatus 10. The substrate 38 is equipped with various electronic parts such as the CPU, a memory, and an SSD. The substrate 38 is attached to a bracket 44 screwed into the chassis 22 and is provided in an upright posture along the top-bottom direction and the right-left direction.

As illustrated in FIG. 2A, the cooling devices 40R, 40L have structures symmetric to each other in the right-left direction, and this also applies to the speaker device 42R, 42L. In view of this, the following description deals with the cooling device 40R and the speaker device 42R on the right side as typical examples, and detailed descriptions about the cooling device 40L and the speaker device 42L on the left side are omitted.

The cooling device 40R is configured to cool the CPU and other electronic parts mounted on the substrate 38. As illustrated in FIGS. 3 to 5, the cooling device 40R includes a fan 46, a fin 48, a heat pipe 50, and a duct component 52.

The fan 46 is a centrifugal fan configured such that an impeller is rotatably stored inside a fan chassis. The fan 46 is supported by the bracket 44 and is placed laterally along a wall surface 22g on the bottom side of the chassis 22. The fin 48 is a heat sink in which a plurality of thin metal plates is arranged at regular intervals.

The fin 48 is placed to face a gas discharge port 46a of the fan 46. Each of the metal plates constituting the fin 48 rises in the top-bottom direction and extends in the right-left direction such that the metal plates are arranged parallel to the front-rear direction. Thereby, a gap through which air sent from the fan 46 passes is formed between the metal plates adjacent to each other.

The heat pipe 50 is a pipe-shaped heat transport device. The heat pipe 50 is formed such that a metal pipe is flattened and formed to have a section having an elliptical shape, and a working fluid is enclosed in a sealed space inside the heat pipe 50. One end portion of the heat pipe 50 is connected to the CPU, and the other end portion of the heat pipe 50 is connected to the fin 48.

As illustrated in FIG. 4, the duct component 52 forms an air duct to guide air A passing through the fin 48 from the gas discharge port 46a of the fan 46 to the side-surface gas discharge port 34. The duct component 52 is a component made of resin or metal. The duct component 52 is constituted by a generally U-shaped plate having three sides perpendicular to each other, for example. The height of a duct formed by the duct component 52 is equal to or slightly higher than the height of the fin 48. The width, in the front-rear direction, of the duct formed by the duct component 52 is equal to or slightly wider than the width, in the front-rear direction, of the fin 48. The duct component 52 may be constituted by an angular cylinder having a rectangular section. In the present embodiment, the wall surface 22g of the flat chassis 22 functions as a bottom wall of the duct formed by the duct component 52, so that the duct component 52 has a generally U-shape not provided with a bottom plate.

The speaker device 42R is a device configured to output sound toward outside the chassis 22. As illustrated in FIGS. 3 to 5, the speaker device 42R includes a speaker unit 54 and a speaker box 55.

The speaker unit 54 is a part from which sound is output actually. The speaker unit 54 is constituted by a diaphragm, a magnet, and a voice coil in combination, for example, and may be identical or similar to a well-known speaker unit.

The speaker box 55 is a box-shaped body in which a cavity serving as a back chamber of the speaker unit 54 is formed, and the speaker box 55 is also called an enclosure. The speaker unit 54 is attached to a front surface of the speaker box 55. The speaker box 55 is provided above the fan 46, the fin 48, and the duct component 52 to cover the fan 46, the fin 48, and the duct component 52. That is, the speaker box 55 has a large width dimension in the front-rear direction and the right-left direction to such an extent that the speaker box 55 covers the fan 46, the fin 48, and the duct component 52 generally entirely. Thereby, the speaker box 55 can secure as large a volume as possible inside the chassis 22.

The speaker box 55 in the present embodiment, that is, the speaker devices 42R, 42L are supported by the chassis 22 by use of a plurality of vibration isolators 56 so as to restrain generated vibrations from being transmitted to the chassis 22.

In view of this, next will be described a specific exemplary configuration of the vibration isolator 56.

Figure 6A:
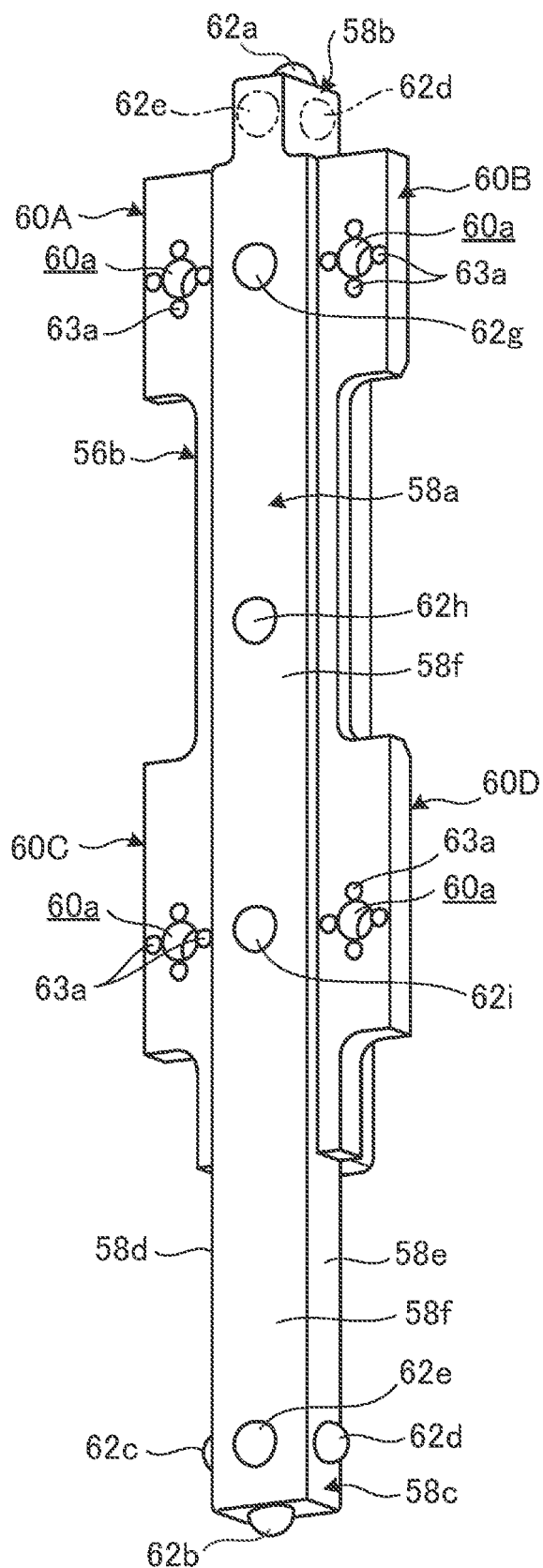
FIG. 6A is a perspective view of a vibration isolator viewed from its front side.
Figure 6B:
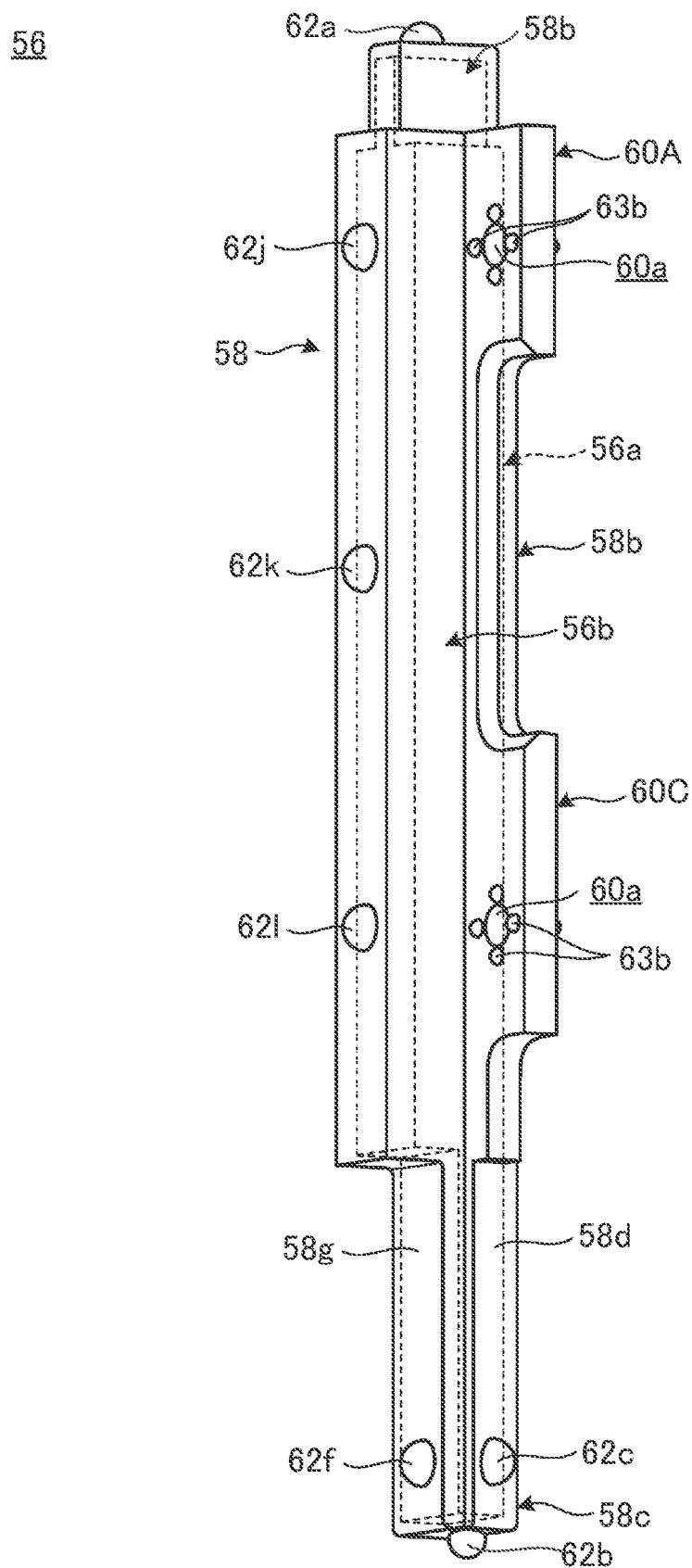
FIG. 6B is a perspective view of the vibration isolator viewed from its back side.
Figure 7:
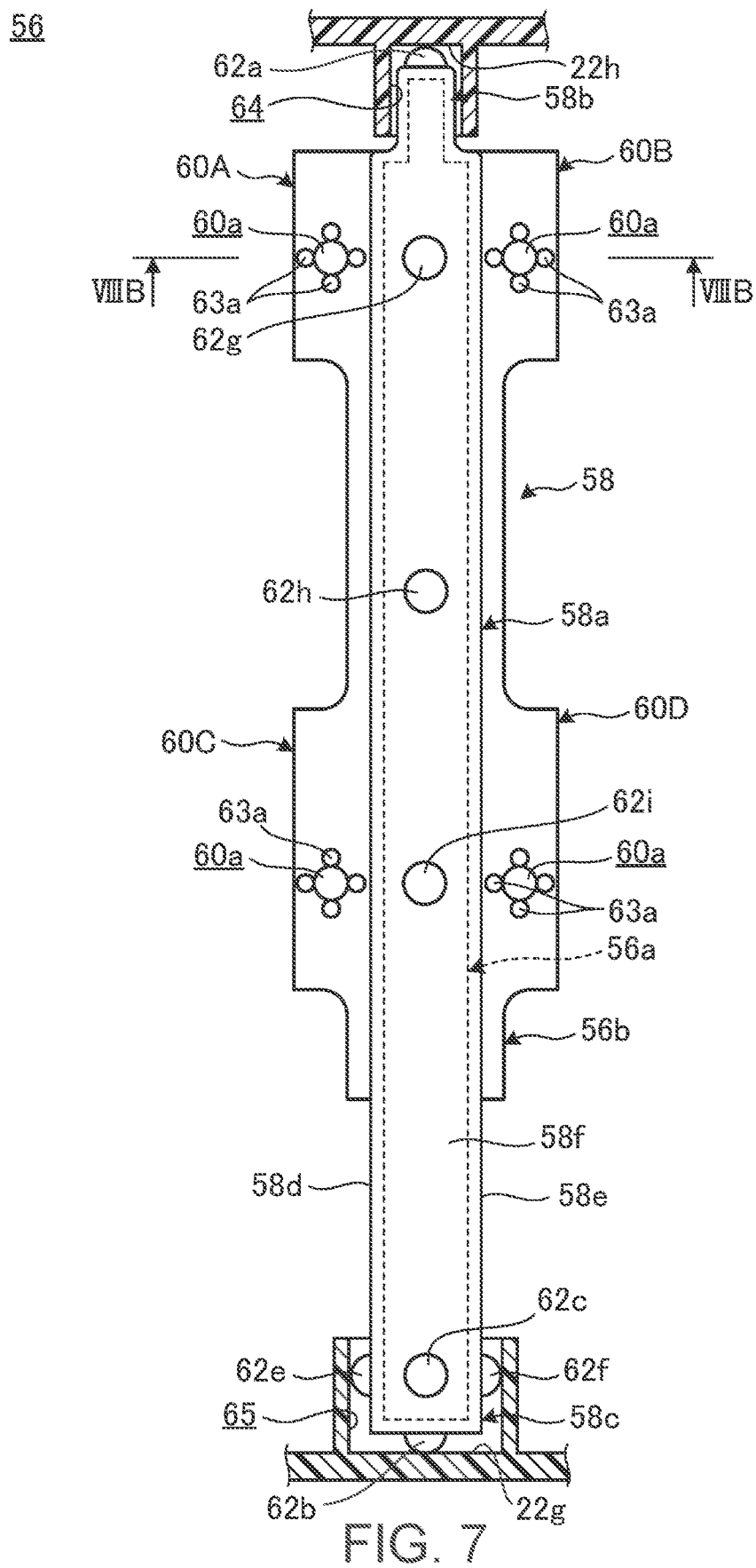
FIG. 7 is a front view of the vibration isolator.
Figure 8A:
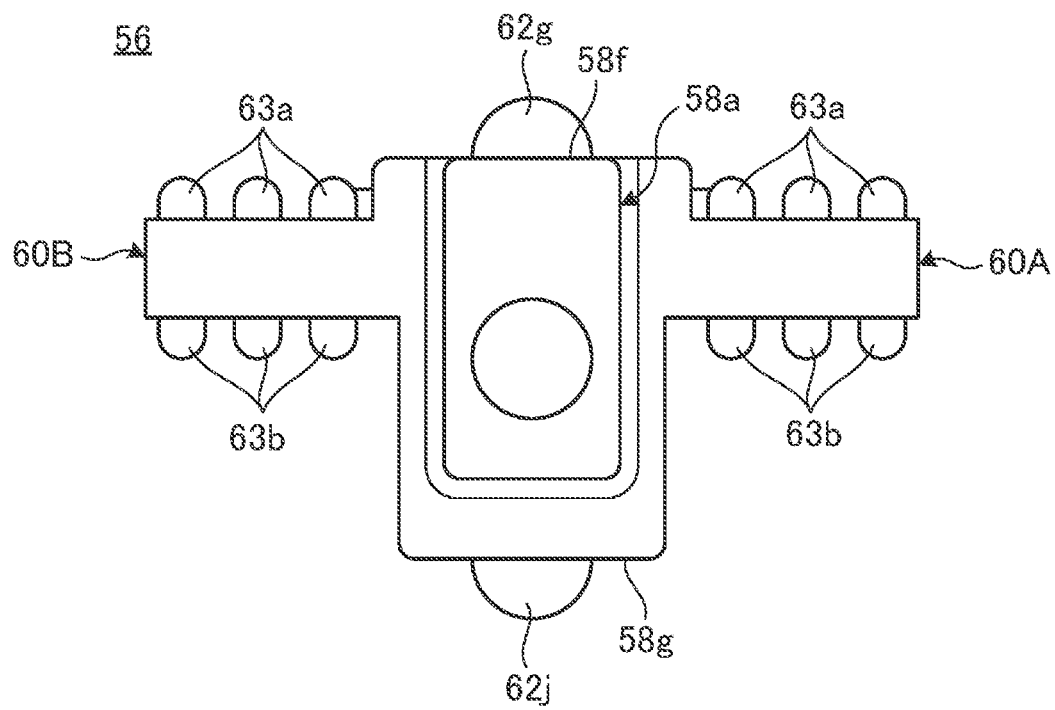
FIG. 8A is a plan view of the vibration isolator.
Figure 8B:
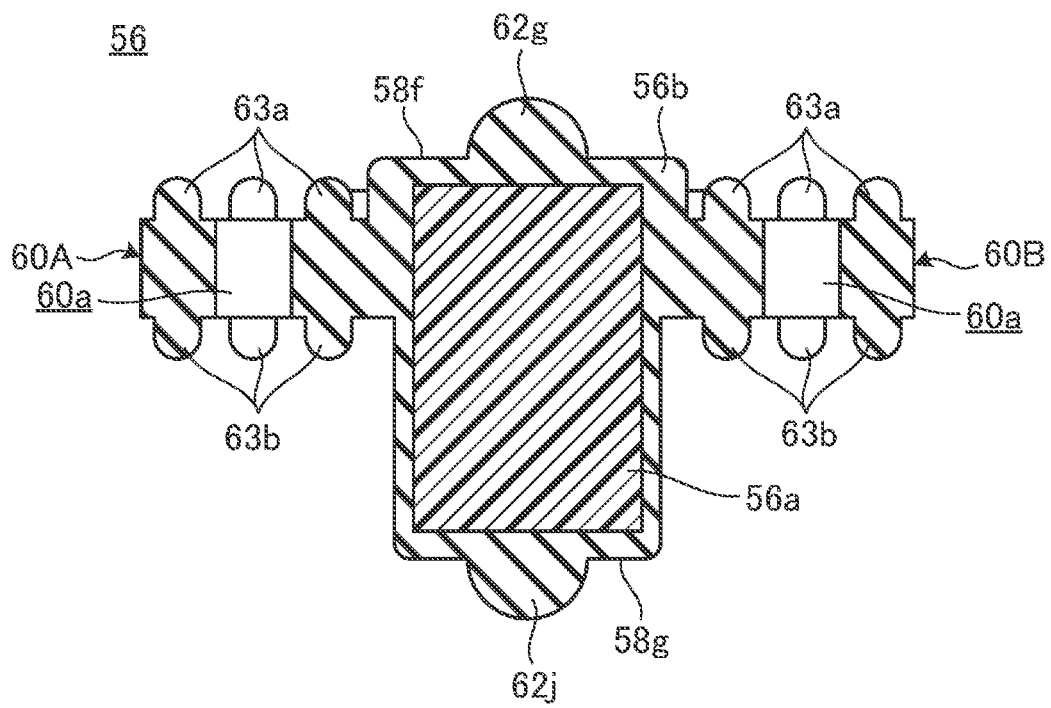
FIG. 8B is a schematic sectional view taken along a line VIIIB-VIIIB in FIG. 7.
Figure 9:
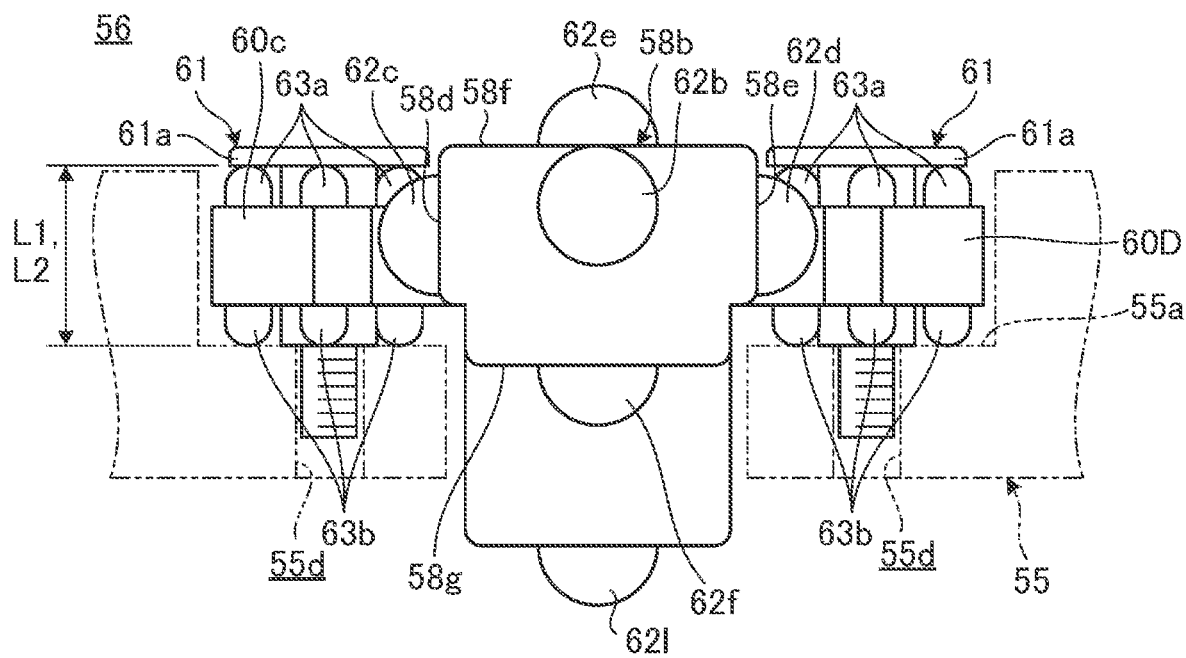
FIG. 9 is a bottom view of the vibration isolator.

FIG. 6A is a perspective view of the vibration isolator 56 viewed from its front side. FIG. 6B is a perspective view of the vibration isolator 56 viewed from its back side. FIG. 7 is a front view of the vibration isolator 56. FIG. 8A is a plan view of the vibration isolator 56. FIG. 8B is a schematic sectional view taken along a line VIIIB-VIIIB in FIG. 7. FIG. 9 is a bottom view of the vibration isolator 56.

As illustrated in FIGS. 3 to 5, two vibration isolators 56 are attached to each of the front surface and a rear surface of the speaker box 55, so that the speaker device 42R (42L) is supported by four vibration isolators 56 in total. The number of the vibration isolators 56 to be mounted may be other than four.

As illustrated in FIGS. 6A to 9, the vibration isolator 56 includes a main body 58 having a bar shape, and four attachment pieces 60A, 60B, 60C, 60D protruding laterally in the right-left direction from the main body 58. The attachment pieces 60A to 60D may have the same basic structure, and therefore, the following description may deal with the attachment pieces 60A to 60D with the attachment pieces 60A to 60D being collectively referred to as an "attachment piece 60."

The main body 58 is formed into a square bar shape and extends along the top-bottom direction. The main body 58 includes a central portion 58a thickened in the front-rear direction, and a first end portion 58b and a second end portion 58c thinner than the central portion 58a. Thereby, the main body 58 has a stepped shape. As will be described later, the vibration isolator 56 of the present embodiment is supported such that the end portions 58b, 58c are inserted into recessed portions 64, 65, respectively, and therefore, the end portions 58b, 58c are formed to be thinner than the central portion 58a. Further, as will be described later, the vibration isolator 56 of the present embodiment is placed such that the second end portion 58c crosses over the fin 48 and the duct component 52, and therefore, the second end portion 58c is formed to be thinner than the central portion 58a so as to prevent the second end portion 58c from interfering with the fin 48 and the duct component 52. It is needless to say that the main body 58 may not have a stepped shape and may be formed to have generally the same diameter over the whole length of the main body 58.

The attachment piece 60 is a part by which the vibration isolator 56 is attached to the speaker box 55. The attachment pieces 60B, 60A protrude from right and left side surfaces 58e, 58d of the main body 58 such that the attachment pieces 60B, 60A are arranged in the right-left direction with the main body 58 being sandwiched therebetween. Similarly, the attachment pieces 60D, 60C protrude from the right and left side surfaces 58e, 58d of the main body 58 such that the attachment pieces 60D, 60C are arranged in the right-left direction with the main body 58 being sandwiched therebetween. That is, the vibration isolator 56 of the present embodiment is provided with a plurality of sets, e.g., two sets, of a pair of right and left attachment pieces 60 in the longitudinal direction of the main body 58.

The attachment piece 60 is a fin-shaped or auricular plate piece, and a hole portion 60a is formed generally in the center of the attachment piece 60. A screw thread 61 with which the attachment piece 60 is fastened to the speaker box 55 is passed through the hole portion 60a.

As illustrated in FIGS. 6B, 7, and 8B, the vibration isolator 56 is constituted by a core 56a and a rubber material 56b. The core 56a is a hard resin material, and thermoplastic resin such as PC/ABS or PCGF (polycarbonate+glass filler) can be used, for example. The core 56a extends along the longitudinal direction of the main body 58. The rubber material 56b is provided to cover the outer surface of the core 56a. The rubber material 56b may be, for example, natural rubber, styrene rubber, nitrile rubber, silicon rubber, butyl rubber, or the like. The vibration isolator 56 is molded by two-color molding of the core 56a and the rubber material 56b, for example.

The core 56a is a bar-shaped member extending along the longitudinal direction of the main body 58, and the periphery of the core 56a is covered with the rubber material 56b, so that the main body 58 is formed. Thereby, the vibration absorbency and the rigidity are well balanced in the main body 58. The attachment piece 60 is made of only the rubber material 56b. That is, the attachment piece 60 is not provided with the core 56a. Thereby, the attachment piece 60 has a high vibration absorbency.

Protrusions 62a to 62l, 63a, 63b having a semispherical shape or a dome shape are formed at respective parts on the outer surface of the vibration isolator 56. The protrusions 62a to 62l, 63a, 63b are made of the rubber material 56b and have a high vibration absorbency.

As illustrated in FIGS. 6A to 9, the protrusion 62a protrudes from an end surface of the first end portion 58b, that is, a top end surface of the vibration isolator 56. The protrusion 62b protrudes from an end surface of the second end portion 58c, that is, a bottom end surface of the vibration isolator 56. The protrusions 62c to 62f protrude from respective surfaces 58d to 58g of the second end portion 58c. The protrusions 62g to 62i protrude from a front surface 58f of the main body 58 such that the protrusions 62g to 62i are arranged along the longitudinal direction of the main body 58. The protrusions 62j to 62l protrude from a back surface 58g of the main body 58 such that the protrusions 62j to 62l are arranged in the longitudinal direction of the main body 58. Some of the protrusions 62c to 62l may be omitted.

The protrusions 63a are provided on one surface (a surface facing the front surface 58f side) of the plate-shaped attachment piece 60. For example, four protrusions 63a are placed along an edge of the hole portion 60a to surround the hole portion 60a. Each of the protrusions 63a abuts with a head 61a of the screw thread 61 passed through the hole portion 60a such that the each of the protrusions 63a is pressed (see FIGS. 9, 10).

The protrusions 63b are provided on the other surface (a surface facing the back surface 58g side) of the plate-shaped attachment piece 60. For example, four protrusions 63b are placed along an edge of the hole portion 60a to surround the hole portion 60a. Each of the protrusions 63b abuts with a surface 55a of the speaker box 55 (see FIGS. 9, 10).

Next will be described a support structure of the speaker box 55 with the use of the vibration isolator 56.

Figure 10:
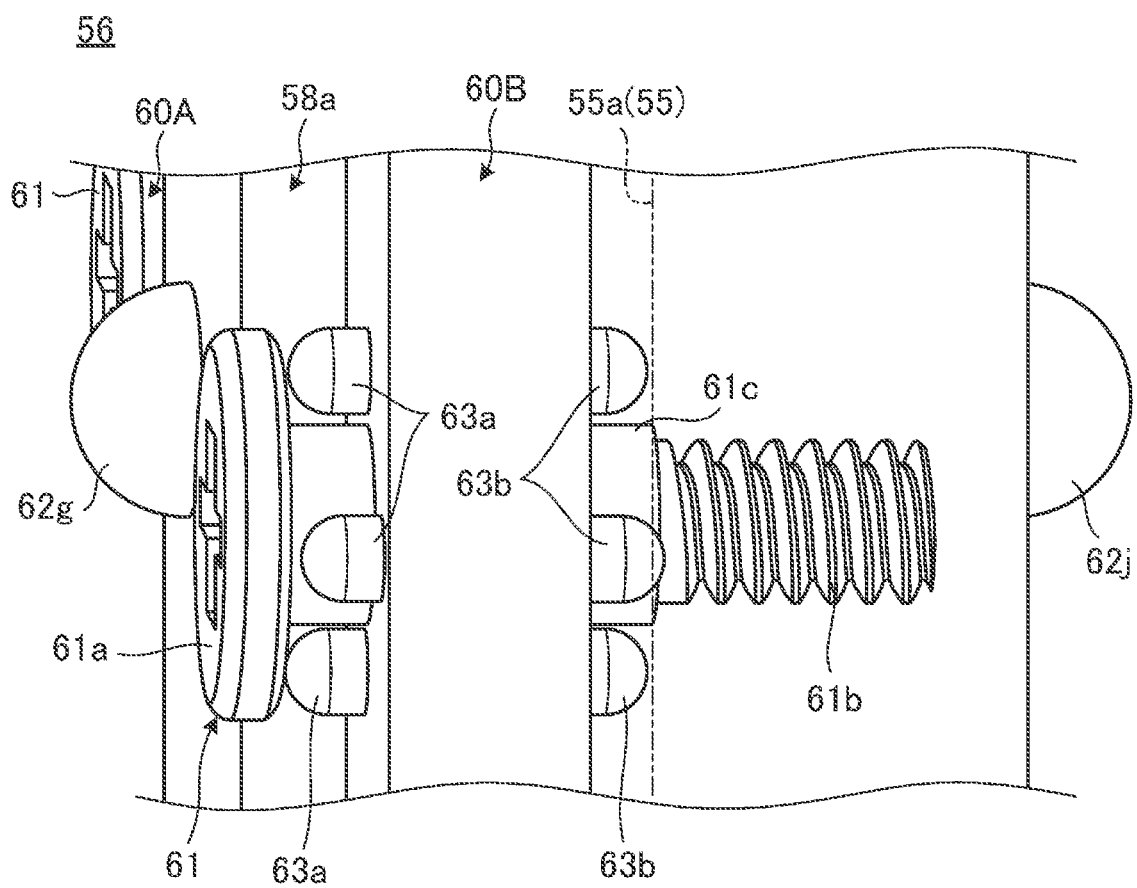
FIG. 10 is a perspective view illustrating an attachment piece of the vibration isolator and its peripheral part in an enlarged manner.
Figure 11:
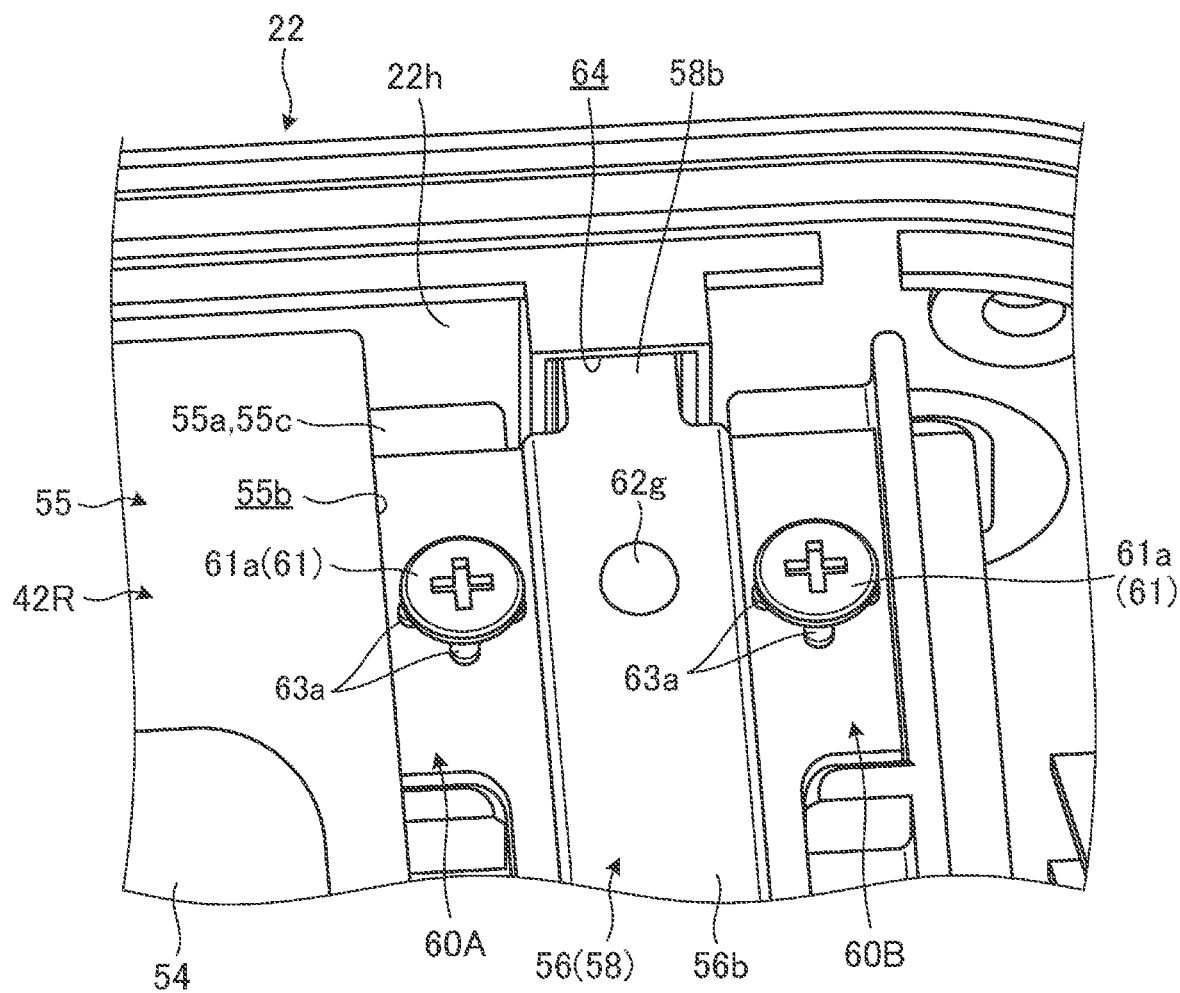
FIG. 11 is a perspective view illustrating a state where a first end portion of the vibration isolator attached to a speaker box is supported by a chassis.

FIG. 10 is a perspective view illustrating the attachment piece 60B of the vibration isolator 56 and its peripheral part in an enlarged manner. FIG. 11 is a perspective view illustrating a state where the first end portion 58b of the vibration isolator 56 attached to the speaker box 55 is supported by the chassis 22.

As illustrates in FIGS. 3 to 5, 9, 11, the vibration isolator 56 is used in such a manner that the vibration isolator 56 is fixed to the speaker box 55. In view of this, the vibration isolator 56 is first attached to the speaker box 55.

Recessed portions 55b are formed on the surface 55a of the speaker box 55 of the present embodiment, and the number of the recessed portions 55b corresponds to the number of the vibration isolators 56 to be attached. In the present embodiment, four vibration isolators 56 are used for each speaker box 55, and therefore, four recessed portions 55b are formed. The recessed portion 55b has a shallow recess into which the attachment piece 60 is inserted, and a deep recess into which the main body 58 is inserted, the deep recess being formed by further denting the center of the shallow recess.

First, the vibration isolator 56 is inserted into the recessed portion 55b from the back surface 58g side. Then, the right and left attachment piece 60A (C), 60B (D) of the vibration isolator 56 abut with respective surfaces 55a of right and left support portions 55c provided as one pair in the recessed portion 55b. At this time, the protrusions 63b of the attachment pieces 60 are pressed against the surfaces 55a of the support portions 55c.

Subsequently, the screw threads 61 are passed through respective hole portions 60a of the attachment pieces 60 and are engaged threadedly with respective threaded holes 55d formed in the support portions 55c of the speaker box 55. Thereby, the vibration isolator 56 is fastened to the speaker box 55. At this time, the protrusions 63b, of the vibration isolator 56, made of the rubber material 56b abut with the surface 55a of the speaker box 55, and the protrusions 63a made of the rubber material 56b abut with respective heads 61a of the screw threads 61. As a result, when the attachment pieces 60 are fixed to the speaker box 55 with the screw threads 61, the vibration isolator 56 is brought into a state where the vibration isolator 56 is attached with elasticity such that only the rubber materials 56b are present between the main body 58 and each of the speaker box 55 and the screw threads 61. That is, the speaker box 55 is connected to the vibration isolator 56 substantially in a floating state.

Particularly, the screw thread 61 of the present embodiment is constituted by a shoulder screw including a non-threaded part 61c provided between the head 61a and a threaded part 61b, as illustrated in FIG. 10. Accordingly, in a state where the threaded part 61b is threadedly engaged with the threaded hole 55d at an appropriate position, the protrusions 63a, 63b are not excessively pressed between the head 61a and the surface 55a, so that the screw thread 61 does not impair the elasticity of the vibration isolator 56. Note that, as illustrated in FIG. 9, a length L1 of the non-threaded part 61c may be set to generally equal to a sum value L2 of the plate thickness of the attachment piece 60 and the heights of the protrusions 63a, 63b, and preferably, L2 may be set to be slightly smaller than L1.

Here, as illustrated in FIG. 4, in a state where the vibration isolator 56 of the present embodiment is fixed to the speaker box 55, the second end portion 58c of the main body 58 largely protrudes downward from a bottom surface 55e of the speaker box 55. That is, the vibration isolator 56 functions as a leg portion protruding downward from the speaker box 55. Note that, in terms of the first end portion 58b of the vibration isolator 56, at least the protrusion 62a protrudes upward from the top surface of the speaker box 55.

Then, the speaker box 55 to which the vibration isolators 56 are thus fixed is set up inside the chassis 22.

As illustrated in FIGS. 7, 11, the first end portion 58b of the vibration isolator 56 is inserted into a bag-shaped recessed portion 64 formed on a wall surface 22h on the top side of the chassis 22, and the protrusion 62a is pressed against the wall surface 22h on the deep side of the recessed portion 64. Further, before or after the insertion operation of the first end portion 58b into the recessed portion 64, the second end portion 58c is inserted into a bag-shaped recessed portion 65 formed on a wall surface 22g on the bottom side of the chassis 22, and the protrusion 62b is pressed against the wall surface 22g on the deep side of the recessed portion 65. At this time, the protrusions 62c to 62f formed on the periphery of the second end portion 58c are also brought into contact with an inner wall of the recessed portion 65.

As a result, the speaker box 55 is supported by the chassis 22 in a state where the end portions 58b, 58c of the four vibration isolators 56 are held by the recessed portions 64, 65 on the top and bottom sides, respectively, and the protrusion 62a, 62b at both ends are pressed against the wall surfaces 22h, 22g of the chassis 22.

At this time, the second end portion 58c, of the vibration isolator 56, largely protruding downward from the speaker box 55 is placed to cross over the fan 46, the fin 48, and the duct component 52 placed below the speaker box 55. That is, the vibration isolator 56 can form a space S where other components are placeable, below the speaker box 55. As a result, the electronic apparatus 10 secures the volume of the speaker box 55 to the maximum, and the mounting space for the duct component 52 and so on is also securable.

As indicated by an alternate long and short dash line in FIG. 6A, four side surfaces 58d to 58g of the first end portion 58b may be provided with the protrusions 62c to 62f similar to those provided in the second end portion 58c and may be brought into contact with an inner wall of the recessed portion 64. Reversely, the protrusions 62c to 62f of the second end portion 58c may be omitted.

As described above, the vibration isolator 56 of the present embodiment includes the main body 58 having a bar shape, and the attachment piece 60 having a plate shape and including the hole portion 60a through which the screw thread 61 to fix the vibration isolator 56 to the speaker box 55 is passed through, the attachment piece 60 being provided to protrude from the main body 58. The main body 58 includes the core 56a and the rubber material 56b covering the surface of the core 56a, and the attachment piece 60 is made of the rubber material 56b.

Accordingly, since the main body 58 having a bar shape includes not only the rubber material 56b but also the core 56a inside the rubber material 56b, the vibration isolator 56 can balance the vibration absorbency with the rigidity. As a result, when the speaker box 55 is supported inside the chassis 22, the vibration isolator 56 can balance a high stability with vibration isolation performance. Particularly, even in a case where the speaker box 55 has a large size and its weight is large, the vibration isolator 56 can achieve stable support.

Further, the vibration isolator 56 is configured such that the attachment piece 60 made of the rubber material 56b is screwed into the speaker box 55. Accordingly, the vibration isolator 56 can absorb the vibration of the speaker box 55 more surely by the attachment piece 60, and the attachment operation of the vibration isolator 56 to the speaker box 55 is extremely easily performable. Further, by adjusting the width or the thickness of the attachment piece 60, the hardness of the rubber material 56b to form the attachment piece 60, or the like, the vibration isolator 56 can easily correspond to a frequency necessary to absorb the vibration of the speaker box 55. Note that only one attachment piece 60 may be provided, but when the four attachment pieces 60A to 60D are placed in a good balance like the present embodiment, the vibration isolation performance is still more stabilized.

Besides, the vibration isolator 56 is configured to absorb most of the vibration of the speaker box 55 by the elasticity of the attachment piece 60 having a thin plate shape and protruding from the lateral side of the main body 58. Accordingly, the influence of the vibration isolator 56 on the depth direction of the speaker box 55 is small, and the vibration isolator 56 can minimize the influence on the volume of the speaker box 55.

The vibration isolator 56 of the present embodiment may include the protrusions 62a, 62b made of the rubber material 56b, on respective end surfaces of the end portions 58b, 58c of the main body 58 having a bar shape. In this configuration, in a state where the vibration isolator 56 is screwed to the side surface of the speaker box 55, the protrusions 62a, 62b protruding from the top and bottom surfaces of the speaker box 55 are brought into contact with the wall surfaces 22h, 22g of the chassis 22. Only with this configuration, the vibration isolator 56 can support the speaker box 55 inside the chassis 22. Accordingly, the speaker box 55 is more easily supported to the chassis 22 by the vibration isolator 56, and further, the contact area of the vibration isolator 56 with the chassis 22 can be also restrained, thereby making it possible to further improve the vibration isolation performance.

Further, the vibration isolator 56 may include the protrusions 62c to 62f on at least either one of the side surfaces 58d to 58g of the end portions 58b, 58c. Thereby, the vibration absorbency improves still more at the time when the end portions 58b, 58c are held by the recessed portions 64, 65 provided in the chassis 22.

Further, the vibration isolator 56 includes the plurality of protrusions 63a, 63b made of the rubber material 56b and placed on the opposite surfaces of the vibration isolator 56 to surround the hole portion 60a. Thereby, cushions constituted by the protrusions 63a, 63b are present between the attachment piece 60 and each of the screw thread 61 and the speaker box 55. As a result, it is possible to further restrain the vibration of the speaker box 55 from being transmitted to the vibration isolator 56 via the screw thread 61.

Further, the vibration isolator 56 may include the protrusions 62c to 62l made of the rubber material 56b and formed on the front surface 58f and the back surface 58g of the main body 58. Thereby, in a case where the speaker box 55 vibrates more than expected, the protrusions 62c to 62l interfere with the inner wall surfaces of the front surface 22a and the back surface 22b of the chassis 22. As a result, it is possible to restrain the speaker box 55 from making contact with the inner wall surfaces of the chassis 22 with impact.

Note that it is needless to say that the present invention is not limited to the above embodiment and is freely modifiable without departing from the gist of the present invention.

The invention claimed is:

1. A vibration isolator for supporting a speaker box in a chassis of an electronic apparatus, the vibration isolator comprising:
   a main body having a bar shape; and
   an attachment piece having a plate shape, the attachment piece including a hole portion configured to enable a threaded screw therein to fix the vibration isolator to the speaker box, the attachment piece protruding from the main body, wherein:
   the main body includes a central portion having a central thickness, a first end portion having a first end thickness, and a second end portion having a second end thickness, wherein the first and second end thicknesses are less than the central thickness;
   the main body includes a longitudinally extending core and a rubber material covering a surface of the core spaced from the first and second end portions; and
   the attachment piece is made of the rubber material.

2. The vibration isolator according to claim 1, wherein:
   the main body includes respective protrusions on an end surface of the first end portion and an end surface of the second end portion of the main body in a longitudinal direction of the main body, the respective protrusions being made of the rubber material.

3. The vibration isolator according to claim 1, wherein:
the attachment piece includes a plurality of protrusions on opposite surfaces of the attachment piece such that the plurality of protrusions surrounds the hole portion, the plurality of protrusions being made of the rubber material.

4. The vibration isolator according to claim 1, wherein:
the attachment piece includes a first attachment piece and a second attachment piece;
the first attachment piece protrudes from one side surface of the main body; and
the second attachment piece protrudes from the other side surface of the main body such that the second attachment piece is arranged with the first attachment piece with the main body being sandwiched between the first attachment piece and the second attachment piece.

5. The vibration isolator according to claim 4, wherein:
a plurality of sets of the first attachment piece and the second attachment piece is in a longitudinal direction of the main body.

6. An electronic apparatus comprising:
a chassis;
a speaker box stored in the chassis; and
a vibration isolator attached to the speaker box and configured to support the speaker box to the chassis, wherein:
the vibration isolator includes:
　a main body having a bar shape, and
　an attachment piece having a plate shape, the attachment piece including a hole portion configured to enable a threaded screw therein to fix the vibration isolator to the speaker box, the attachment piece protruding from the main body;
　the main body includes a central portion having a central thickness, a first end portion having a first end thickness, and a second end portion having a second end thickness, wherein the first and second end thicknesses are less than the central thickness;
　the main body includes a longitudinally extending core and a rubber material covering a surface of the core spaced from the first and second end portions; and
　the attachment piece is made of the rubber material.

7. The electronic apparatus according to claim 6, wherein:
the main body includes respective protrusions on an end surface of the first end portion and an end surface of the second end portion of the main body in a longitudinal direction of the main body, the respective protrusions being made of the rubber material; and
the protrusions on the end surface of the first end portion and the end surface of the second end portion in the vibration isolator abut with a wall surface of the chassis.

8. The electronic apparatus according to claim 6, wherein:
the attachment piece includes a plurality of protrusions on opposite surfaces of the attachment piece such that the plurality of protrusions surrounds the hole portion, the plurality of protrusions being made of the rubber material;
the threaded screw includes a threaded part and a head; and
the attachment piece is fixed to the speaker box in a state where the protrusions on one of the opposite surfaces of the attachment piece abut with a surface of the speaker box, and the protrusions on the other one of the opposite surfaces of the attachment piece are configured to abut with the head.

9. The electronic apparatus according to claim 8, wherein:
the threaded screw thread is a shoulder screw including a non-threaded part between the threaded part and the head; and
the non-threaded part has a length equal to a sum value of a plate thickness of the attachment piece and respective heights of the protrusions formed on the opposite surfaces of the attachment piece.

10. The electronic apparatus according to claim 7, further comprising:
components in the chassis and arranged on a side of one surface of the speaker box, wherein:
the vibration isolator includes a plurality of vibration isolators on a periphery of the speaker box and forms, between the wall surface of the chassis and the one surface of the speaker box, a space in which the components are disposed, in a state where respective first end portions and respective second end portions of the plurality of vibration isolators abut with the wall surface.

* * * * *